US007296326B2

(12) United States Patent
Madachy et al.

(10) Patent No.: US 7,296,326 B2
(45) Date of Patent: Nov. 20, 2007

(54) CARGO TIGHTENER AND STRAP COLLECTOR

(75) Inventors: Frank Joseph Madachy, Genoa, OH (US); John Scott Yoder, Holland, OH (US)

(73) Assignee: Ratchet Enterprises, LLC, Sylvania, OH (US)

( * ) Notice: Subject to any disclaimer, the term of this patent is extended or adjusted under 35 U.S.C. 154(b) by 156 days.

(21) Appl. No.: 11/227,313

(22) Filed: Sep. 15, 2005

(65) Prior Publication Data

US 2007/0056146 A1 Mar. 15, 2007

(51) Int. Cl.
*B25B 25/00* (2006.01)
*B65H 77/00* (2006.01)

(52) U.S. Cl. .................... 24/68 CD; 24/68 R; 254/218

(58) Field of Classification Search ............... 24/68 R, 24/69 R, 70 ST, 69 ST, 69 CT, 71 R, 71 ST, 24/71 CT, 68 CD; 242/373, 378.4, 385.4, 242/388.1–388.7, 395, 395.1, 399, 399.2, 242/400, 401; 254/213, 214, 216–218, 223, 254/225, 369, 376, 380, 382; 410/12, 97, 410/100, 103, 105, 106, 110
See application file for complete search history.

(56) References Cited

U.S. PATENT DOCUMENTS

| 4,622,721 | A | 11/1986 | Smetz et al. |
| 5,316,266 | A * | 5/1994 | Chou ......................... 254/364 |
| 5,611,520 | A | 3/1997 | Soderstrom |
| 6,102,371 | A | 8/2000 | Wyers |
| 6,609,275 | B1 | 8/2003 | Lin |
| 6,796,758 | B2 | 9/2004 | Coslovi et al. |
| 7,100,901 | B2 * | 9/2006 | Gleinser ..................... 254/218 |
| 7,100,902 | B1 * | 9/2006 | Lu ............................. 254/218 |
| 2004/0094650 | A1 | 5/2004 | Huang |

FOREIGN PATENT DOCUMENTS

DE 36 39 712 A1 6/1988
WO WO 93/18937 9/1993

OTHER PUBLICATIONS

Online Catalog; www.Tarps4Less.com.

* cited by examiner

*Primary Examiner*—James R. Brittain
*Assistant Examiner*—Ruth C. Rodriguez
(74) *Attorney, Agent, or Firm*—Marshall & Melhorn, LLC

(57) ABSTRACT

A cargo tightener and strap collector is shown having a rotatable shaft provided on the lever portion of the cargo tightener and strap collector. A slot is provided in the shaft so that the free end of a strap may be inserted in the slot and wound on the shaft to secure the strap and prevent its fluttering in the wind or trailing on the ground while in use.

14 Claims, 4 Drawing Sheets

CARGO TIGHTENER AND STRAP COLLECTOR

BACKGROUND OF THE INVENTION

1. Field of Invention

The present invention relates to a device for collection and storage of the free, non-active, portion of a strap of a manually operated cargo tightener which is used to secure cargo to be transported.

2. Description of the Related Art

The typical prior art cargo tightener, which is modified to make the present invention, includes a shaft provided at one end of a connecting link or arm. The shaft is journaled in one end of the connecting arm, thus providing for rotatable attachment of a lever to the connecting arm. A first, or short, strap is firmly secured to a bolt or pin in the other end of the connecting arm, and has at its free end, a hook or other device for attachment to a vehicle transporting the cargo.

A second strap has a hook or other device at one of its ends. The hook is attached to the transportation vehicle. The other end, or free or non-active, end of the second strap is inserted through a slot in the rotatable shaft. A ratchet arrangement permits tightening of the strap by back and forth movement of the lever with respect to the connecting link. Because the connecting arm or link is held firmly in place by the first strap, the second strap tightens down over the cargo. The cargo tightener is conventional and, therefore, will not be described in any great detail except with regard to the modification of the lever to provide the strap collector portion of the present invention.

A common problem when using the above mentioned cargo tightener with tensioning straps concerns the handling of the free end of the strap not used when securing the cargo. This strap portion has to be thoroughly secured to the cargo in order not to flutter in the encountering wind, or to trail on the ground, both cases leading to a hasty soiling and wearing down of the strap. Further, a freely fluttering strap is a danger to traffic, particularly in connection with the wider 24 to 30 foot long straps used professionally by haulage contractors.

Many attempts to solve these problems are known in the prior art. US Patent Publication No. US 2004/0094650 A1 to Huang, shows a strap fastener system including a strap fastener for fastening a belt, and a winding device for winding the strap. The winding device includes a housing which is attached to a connecting arm portion of the typical prior art cargo tightener. A reel is put in the housing for winding the strap, and a torque spring is arranged between the reel and the control device for automatically rotating the reel in the non-rotational position of the control device.

U.S. Pat. No. 5,611,520 to Söderström, shows a strap collector which is designed to be attached to the connecting arm of a standard cargo tightener. The strap collector includes a magazine for the protection and storage of the long tensioning strap of the cargo tightener when wound to the shaft of the strap collector.

U.S. Pat. No. 6,609,275 B1 to Lin, shows a strap tightener with an auto pulling device connected to a seat. The auto pulling device includes a housing and a reversing device. The reversing device is rotatably received in the housing. The housing would correspond to a connecting arm portion of a prior art cargo tightener.

U.S. Pat. No. 6,102,371 to Wyers, shows a strap tensioning and collection device having a variable length strap and a fixed length strap operatively associated with the strap storage section, and a strap tensioning section.

U.S. Pat. No. 4,622,721 to Smetz, et al. shows a device for connecting components to a belt.

German Offenlegungsschrift DE 36 39 712 A1 to Kinnert, shows a tensioning ratchet, in particular for belts, which is equipped with a ratchet body having a retaining bolt for fastening a safety belt, and having a ratchet lever which is mounted at the other end of the ratchet body so as to be rotatable about the axle of a slotted roller for fastening the end of a tensioning belt to be wound thereon.

All of the above devices perform generally satisfactorily, but share the problem of relatively high costs and difficulty of manufacture. In addition, they are rather bulky. Thus, those skilled in the art continued their search for a better cargo tightener and strap collector.

SUMMARY OF THE INVENTION

The aim of the present invention is to provide a cargo tightener and strap collector which is more cost effective compared with prior art devices, is less bulky, and is easier to manufacture. This is accomplished by having the strap collector on the lever portion of the cargo tightener, rather than on the connecting arm segment, as in the prior art. The advantages of this will become apparent by a careful reading of the detailed description, with appropriate reference to the accompanying drawings, wherein like numerals designate like parts in the several views.

BRIEF DESCRIPTION OF THE DRAWINGS

The invention is to be described in more detail below using exemplary embodiments.

DETAILED DESCRIPTION OF THE PREFERRED EMBODIMENT

Figure 1:
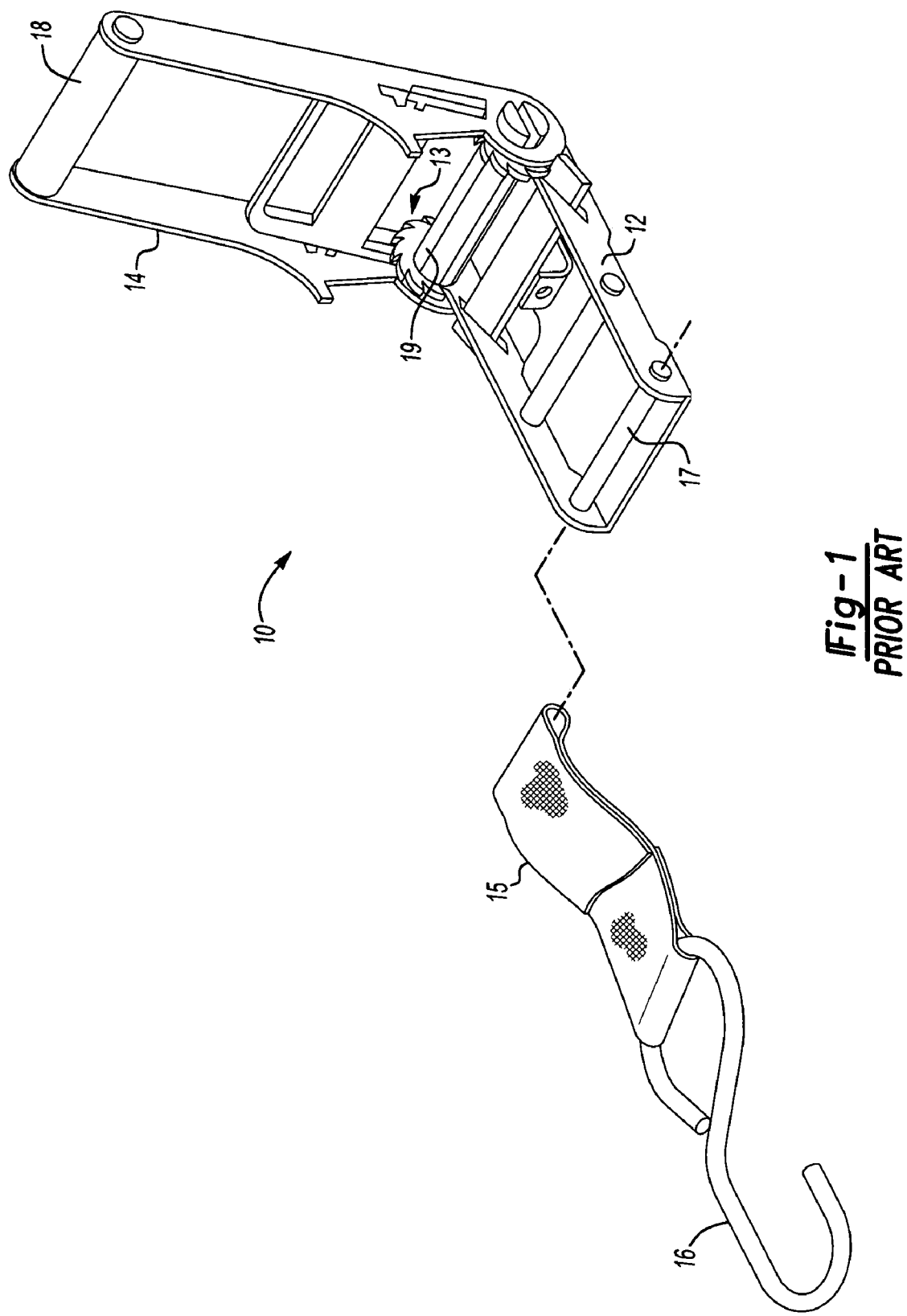
FIG. 1 is a perspective view of a prior art cargo tightener.

Referring to FIG. 1, there is shown a prior art cargo tightener and strap collector, generally designed by the numeral 10. The cargo tightener and strap collector 10 comprises a connecting arm or link 12, and a lever or arm 14. A strap 15 is provided with a hook 16 at one end thereof for connection to a transportation vehicle (not shown). The other end of strap 15 is firmly held to connecting arm 12 by pin 17. Reciprocal motion of lever 14 using handle 18 will cause shaft 19 to rotate due to the ratchet and pawl assembly 13.

The present invention relates to a modification of the lever or arm 14 to solve the problems of the prior art. For purposes of understanding, new reference numerals are used when referring to the present invention.

Figure 2:
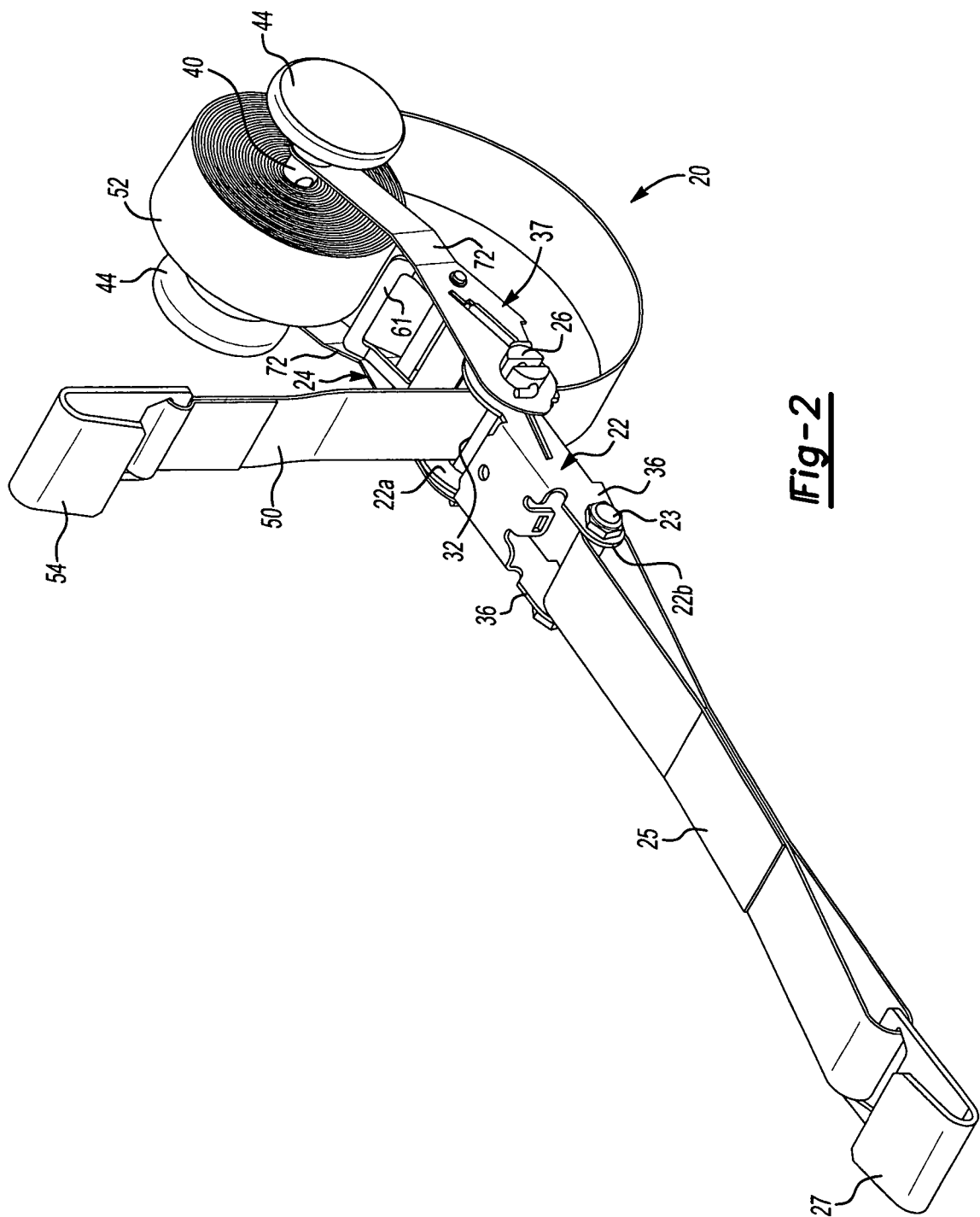
FIG. 2 is a perspective view of a construction embodying the present invention.
Figure 3:
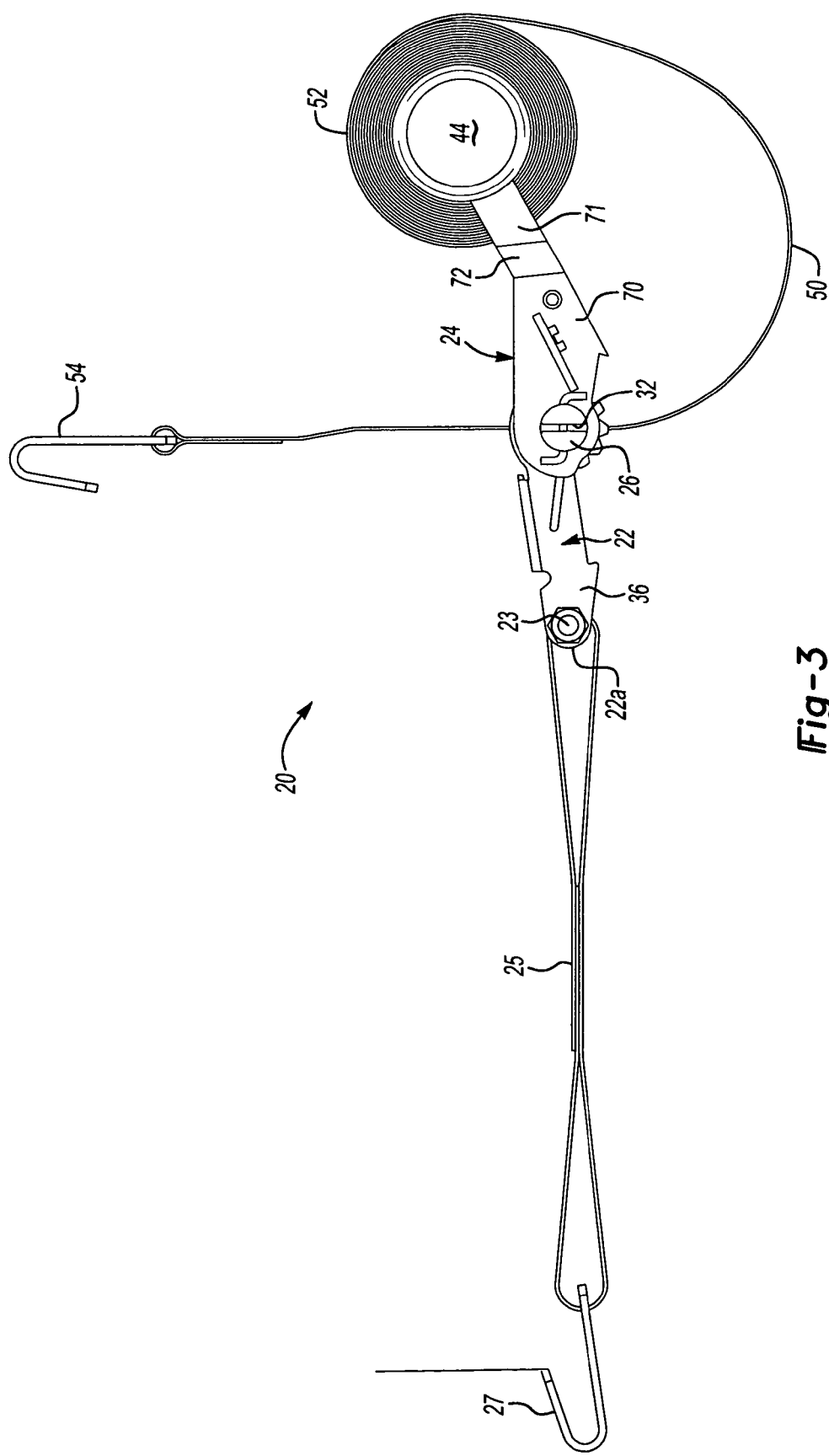
FIG. 3 is an elevational view of the construction of FIG. 2 in its open position.
Figure 4:
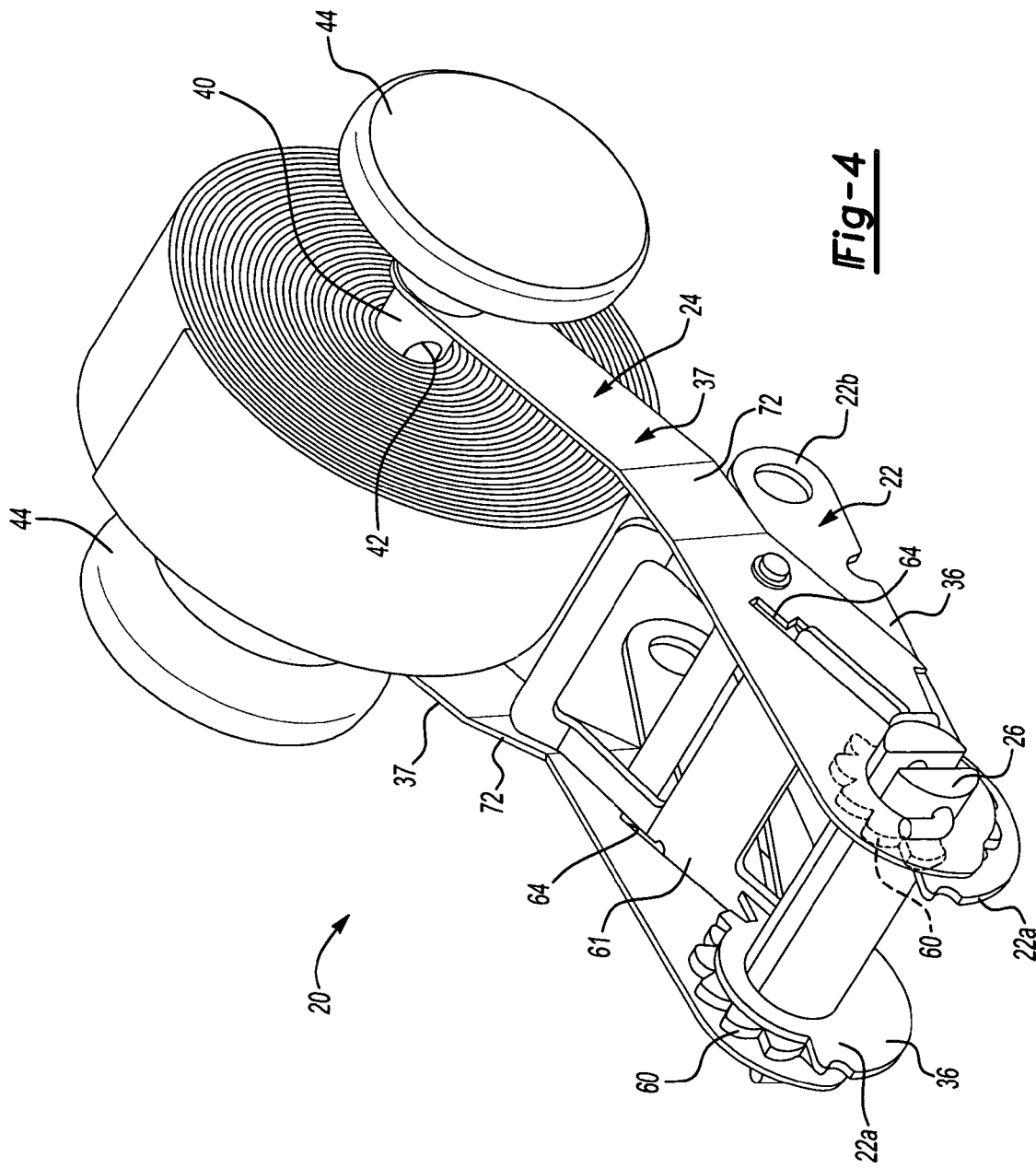
FIG. 4 is a perspective view of the construction of FIG. 2 in its closed position.

Referring now to FIGS. 2-4, the present invention relates to an improved cargo tightener and strap collector, generally designated by the numeral 20. An improved apparatus for tightening and collecting a strap, or strap collector, or combination cargo tightener and strap collector 20, includes a connecting arm or link 22 and a lever 24. Connecting arm 22 extends in a longitudinal direction, and may be substantially similar to the connecting arm 12 shown in the prior art construction of FIG. 1. It is a modification to the lever of the prior art construction, identified by the numeral 24, which provides a novel cargo tightener and strap collector 20. As with the prior art, there is provided a first shaft 26 journaled for rotation in one, or first, end 22A of the connecting arm 22. At the other, or second, end 22B of the connecting arm 22 is provided a pin 23, to which a first, or short, strap 25 is attached. A first hook or fastening means or fastening device 27 is attached to the other end of the strap 25. In use, the hook 27 will be attached to the transportation vehicle on which the cargo being tightened is being transported.

As in the prior art devices, reciprocal rotation of the lever 24 will cause co-rotation of the first shaft 26. Journals for first shaft 26, as well as second shaft 40, are provided by opposed apertures provided in a first pair of spaced apart sidewalls 36 provided in connecting arm 22, and a second pair of spaced apart sidewalls 37 in the lever 24. A second shaft 40 has provided therein second slot 42 (FIG. 4) to accept a free end, i.e., the end without the second hook 54, of a second belt 50, as hereinafter described.

At least a first portion 40A of shaft 40 may extend beyond at least one of the second pair of sidewalls 37 (FIG. 2) so that a knob 44 may be attached thereto for rotation of the second shaft 40. In the preferred embodiment, a first portion and a second portion (40A, 40B) of the second shaft 40 will extend beyond the second pair of spaced apart sidewalls 37, and a knob 44 will be attached to each portion of the second shaft.

Reciprocal rotation of the lever 24 will cause co-rotational rotation of the first shaft 26 by virtue of a pair of ratchet wheels 60 which are mounted on the first shaft 26 between the first pair of sidewalls 36 and the second pair of spaced apart sidewalls 37. It is preferred that two ratchet wheels 60 be used, although one may possibly be used. Pawl 61 aides in the rotation of the first shaft 26 by operating on the ratchet wheel 60. The pawl 61 is spring loaded and slides in a pair of opposed slots 64 (FIG. 4) in the second pair of opposed sidewalls 37.

Second, or long, strap 50 is provided having second hook 54 provided at one end thereof. The free or non-active end of strap 50, so referred to because it has no connection to second hook 54, is first passed through first slot 32 and then inserted in second slot 42 (FIG. 4). Second shaft 40 is then rotated, with the aid of knobs 44, to roll up free end of strap 50 into a roll 52.

In use, second hook 54 and second strap 50 are completely unrolled and removed from second shaft 40. Second hook 54 is attached to the transportation vehicle on which the cargo is to be transported, at the appropriate location. The free end of the strap 50 is placed through first slot 32 in first shaft 26, and the lever 24 is reciprocally rotated, causing co-rotational movement of the first shaft 26. Since the first strap 50 is inserted in the first slot 32, and the connecting arm 22 is restrained by the first strap 25 and the first hook 27, the cargo tightener and strap collector 20 is tightened down on the cargo. At this point, the free end of the second strap 50 is inserted in the second slot 42 in the second shaft 40 and the knobs 44 are rotated to take up any slack in the strap before the cargo is transported.

Alternately, the free end of the strap of the second strap 50 may be left inserted in the second slot 42 in the second shaft 40, and the second strap 50 along with second hook 54 may be pulled out, causing the roll 52 to unwind until the second hook 54 may be attached to the transportation vehicle in the appropriate spot. The lever 24 is then reciprocally rotated causing co-rotational movement of the first shaft 26, and the tightening of the cargo tightener and strap collector 20 on the cargo (not shown) in the manner previously described. Any slack in the second strap 50 is taken up by rotating the knob or knobs 44 until the slack is removed.

In order to provide clearance for the roll 52 so that it does not strike the cargo being transported, the lever 24 is provided with a first substantially linearly extending portion 70, and a second linearly extending portion 71 extending at an angle with respect to the first portion 70, thus elevating the roll 52 away from the cargo by elevating the second shaft 40 away from the cargo.

If it is desired to have the linearly and angularly extending portions 71 of the second pair of sidewalls 37 be further apart proximate the roll 52, a pair of diverging portions 72 of the second pair of sidewalls 37 may be interposed between the first linearly extending portion 70 and the second linearly and angularly extending portion 71 of each of said second pair of sidewalls 37.

Thus, by carefully considering the problems in the prior art devices, we have provided a novel cargo tightener and strap collector which is simpler in construction, easier to manufacturer and less costly than prior art devices.

What is claimed:

1. An apparatus for tightening and collecting a strap, comprising:
   a) a cargo tightening portion comprising:
      i) a connecting arm extending in a longitudinal direction, the connecting arm having a first pair of spaced apart sidewalls;
      ii) a lever pivotally journaled in the connecting arm by a first shaft, the lever having a second pair of spaced apart sidewalls, the first shaft having a first slot for introducing an end of a strap, the first shaft being operable for co-rotational movement with the lever for tightening the strap; and
   b) a strap collector portion comprising a second shaft rotatably mounted to the second pair of spaced apart sidewalls of the lever, the second shaft having a second slot therein to accept the end of the strap after the strap is tightened on the cargo
   c) at least one toothed ratchet wheel fixedly mounted to the first shaft between the first pair of spaced apart sidewalls and the second pair of spaced apart sidewalls; and
   d) a pawl mounted to the lever for reciprocal movement to engage and disengage from the at least one toothed ratchet wheel and cause the rotation of the first shaft.

2. A strap collector comprising:
   a) a connecting arm extending in a longitudinal direction, the connecting arm having a first pair of spaced apart sidewalls;
   b) a lever pivotally journaled in the connecting arm by a first shaft, the lever having a second pair of spaced apart sidewalls, the first shaft having a first slot for introducing an end of a strap, the first shaft being operable for co-rotational movement with the lever for tightening the strap;
   c) a second shaft mounted to the second pair of spaced apart sidewalls of the lever for rotation, the second shaft having a second slot therein to accept the end of the strap after the strap is tightened on the cargo;
   c) at least one toothed ratchet wheel fixedly mounted to the first shaft between the first pair of spaced apart sidewalls and the second pair of spaced apart sidewalls; and
   d) a pawl mounted to the lever for reciprocal movement to engage and disengage from the at least one toothed ratchet wheel and cause the rotation of the first shaft.

3. A combination cargo tightener and strap collector comprising:

a) a connecting arm extending in a longitudinal direction, the connecting arm having a first pair of spaced apart sidewalls;

b) a lever pivotally journaled in the connecting arm by a first shaft, the first shaft having a first slot for introducing an end of a strap, the first shaft operable for co-rotational movement with the lever for tightening the strap, the lever having a second pair of spaced apart sidewalls;

c) a second shaft mounted to the second pair of spaced apart sidewalls of the lever for rotation, the second shaft having a second slot therein to accept the end of the strap after the strap is tightened on the cargo d) at least one toothed ratchet wheel fixedly mounted to the first shaft between the first pair of spaced apart sidewalls and the second pair of spaced apart sidewalls; and e) a pawl mounted to the lever for reciprocal movement to engage and disengage from the at least one toothed ratchet wheel and cause the rotation of the first shaft.

4. The combination cargo tightener and strap collector defined in claim 3, wherein a first portion of the second shaft extends past at least one of the second pair of spaced apart sidewalls of the lever.

5. The combination cargo tightener and strap collector defined in claim 4, further comprising turning aid means mounted to the first portion of the second shaft extending past at least one of the second pair of spaced apart sidewalls of the lever.

6. The combination cargo tightener and strap collector defined in claim 5, wherein each one of the second pair of spaced apart sidewalls of the lever comprises a straight portion and a portion extending at an angle to the straight portion.

7. The combination cargo tightener and strap collector defined in claim 6, wherein each one of the second pair of spaced apart sidewalls of the lever comprises a first linearly extending portion and a second linearly extending portion extending at an angle to the first linearly extending portion.

8. The combination cargo tightener and strap collector defined in claim 7, wherein each one of the second pair of spaced apart sidewalls of the lever comprises a diverging portion between the first linearly extending portion, and the second linearly extending portion, whereby the second linearly extending portion of the second pair of spaced apart sidewalls is spaced apart further than the first linearly extending portion of the second pair of spaced apart sidewalls.

9. The combination cargo tightener and strap collector defined in claim 5, wherein the turning aid means comprises a knob mounted to the first portion of the second shaft extending past the at least one of the second pair of spaced apart sidewalls of the lever.

10. The combination cargo tightener and strap collector defined in claim 9, further comprising a second portion of the second shaft extending past the other of the second pair of spaced apart sidewalls of the lever and a knob mounted to the second portion of the second shaft.

11. The combination cargo tightener and strap collector defined in claim 6, wherein the pawi is mounted in a slot in the lever.

12. An apparatus for tightening and collecting a strap, comprising:

a) a cargo tightening portion comprising:

i) a connecting arm extending in a longitudinal direction, the connecting arm having a first pair of spaced apart sidewalls;

ii) a lever pivotally journaled in the connecting arm by a first shaft, the lever having a second pair of spaced apart sidewalls, the first shaft having a first slot for introducing an end of a strap, the first shaft being operable for co-rotational movement with the lever for tightening the strap;

b) a strap collector portion comprising a second shaft mounted for rotation to the second pair of spaced apart sidewalls of the lever, the second shaft having a second slot therein to accept the end of the strap after the strap is tightened on a cargo;

c) at least one toothed ratchet wheel fixedly mounted to the first shaft between the first pair of spaced apart sidewalls and the second pair of spaced apart sidewalls; and d) a pawl mounted to the lever for reciprocal movement to engage and disengage from the at least one toothed ratchet wheel and cause the rotation of the first shaft wherein each one of the second pair of spaced apart sidewalls of the lever comprises a straight portion and a portion extending at an angle to the straight portion.

13. An apparatus for tightening and collecting a strap, comprising:

a) a cargo tightening portion comprising:

i) a connecting arm extending in a longitudinal direction, the connecting arm having a first pair of spaced apart sidewalls;

ii) a lever pivotally journaled in the connecting arm by a first shaft, the lever having a second pair of spaced apart sidewalls, the first shaft having a first slot for introducing an end of a strap, the first shaft being operable for co-rotational movement with the lever for tightening the strap;

b) a strap collector portion comprising a second shaft mounted for rotation to the second pair of spaced apart sidewalls of the lever, the second shaft having a second slot therein to accept the end of the strap after the strap is tightened on a cargo, c) at least one toothed ratchet wheel fixedly mounted to the first shaft between the first pair of spaced apart sidewalls and the second pair of spaced apart sidewalls; and d) a pawl mounted to the lever for reciprocal movement to engage and disengage from the at least one toothed ratchet wheel and cause the rotation of the first shaft, wherein each one of the second pair of spaced apart sidewalls of the lever comprises a diverging portion between the first linearly extending portion, and the second linearly extending portion, whereby the second linearly extending portion of the second pair of spaced apart sidewalls is spaced apart further than the first linearly extending portion of the second pair of spaced apart sidewalls.

14. An apparatus for tightening and collecting a strap, comprising:

a) a cargo tightening portion comprising:

i) a connecting arm extending in a longitudinal direction, the connecting arm having a first pair of spaced apart sidewalls;

ii) a lever pivotally journaled in the connecting arm by a first shaft, the lever having a second pair of spaced apart sidewalls, the first shaft having a first slot for introducing an end of a strap, the first shaft being operable for co-rotational movement with the lever for tightening the strap; and b) a strap collector portion comprising a second shaft rotatably mounted to the second pair of spaced apart sidewalls of the lever, the second shaft having a second slot therein to accept the end of the strap after the strap is tightened on the cargo, c) at least one toothed ratchet wheel fixedly mounted to the first shaft between the first pair of spaced apart sidewalls and the second pair of spaced apart sidewalls; and, a pawl mounted to the lever for reciprocal movement to engage and disengage from the at least one toothed ratched wheel and cause the rotation of the first shaft wherein the length of the lever from the end proximate the first shaft to the second shaft is greater than the length of the connecting arm.

* * * * *